March 30, 1926.
M. A. REPLOGLE
TIRE BAND EXPANDER
Filed May 20, 1925
1,578,760
2 Sheets-Sheet 1
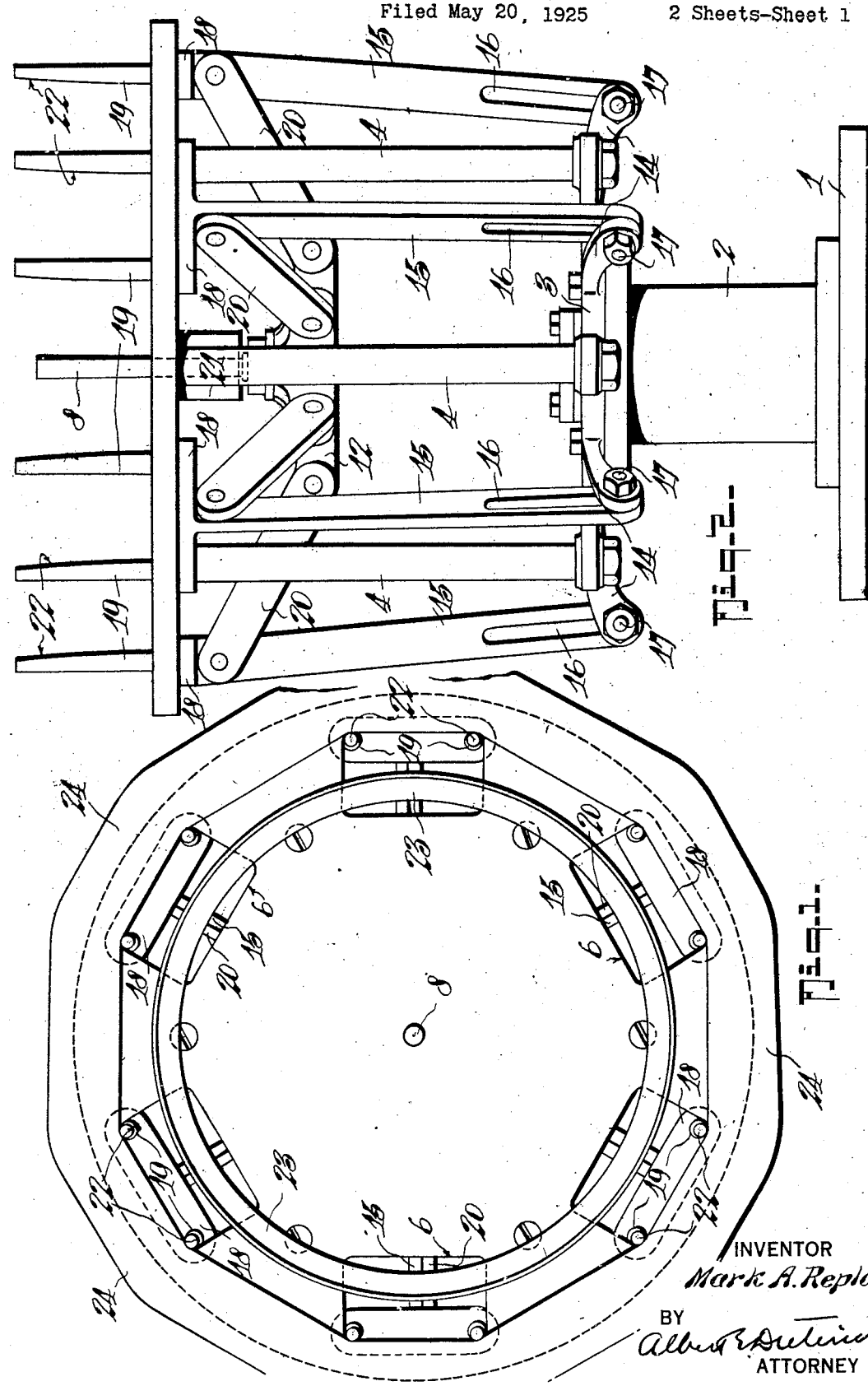
INVENTOR
Mark A. Replogle
BY
Albert E Dutrich
ATTORNEY

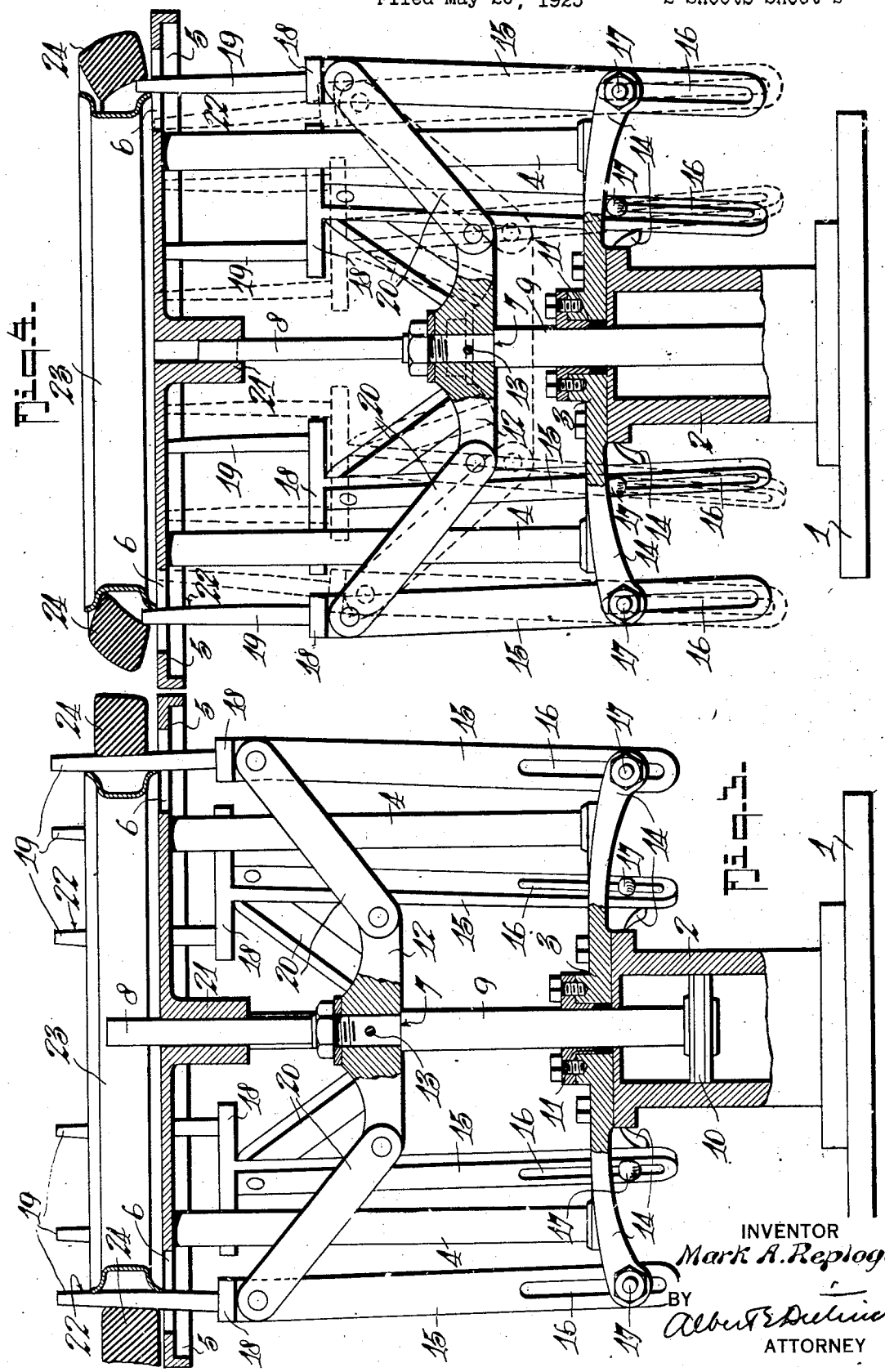

Patented Mar. 30, 1926.

1,578,760

UNITED STATES PATENT OFFICE.

MARK A. REPLOGLE, OF AKRON, OHIO, ASSIGNOR TO LAMBERT TIRE & RUBBER CO., OF BARBERTON, OHIO, A CORPORATION OF ARIZONA.

TIRE-BAND EXPANDER.

Application filed May 20, 1925. Serial No. 31,643.

*To all whom it may concern:*

Be it known that I, MARK A. REPLOGLE, a citizen of the United States, residing at Akron, in the county of Summit and State of Ohio, have invented certain new and useful Improvements in Tire-Band Expanders, of which the following is a specification.

My invention relates to the art of manufacturing cushion tires on their rims. In making some types of cushion tires the stock is tubed into a strip which is then cut in lengths the ends lap jointed together and secured to give the strip an endless band or ring-like form, the interior diameter of which is less than the exterior diameter of the rim onto which it must be stretched before the rim and band is placed in the shaping mold, the band pressed to the desired form and vulcanized. The stretching of the band, particularly for the large size tires, requires the services of two men and involves the exercise of considerable muscular effort. It is therefore one of the objects of my invention to provide a machine for stretching the band and placing it automatically in position on the rim without requiring the services of more than one attendant to control the machine, place the band and rim on the machine and remove the assembly therefrom, thus cutting the labor cost in half.

Generically the invention resides in providing a table for receiving the rim, fingers for receiving the band and means for manipulating the fingers to stretch the band, i. e. increase the interior diameter, and place the stretched band on the rim and withdraw the fingers so that the band will locate on the rim, the fingers withdrawn from the table and the assembly removed.

More subordinately the invention resides in those novel features of construction, combination and arrangement of parts, all of which will be first fully described, then be specifically pointed out in the appended claims, reference being had to the accompanying drawings, in which:—

Figure 1 is a plan view of my invention, the rim being located on the table and the band stretched.

Figure 2 is a side elevation of the same with the pins up.

Figure 3 is a vertical longitudinal section of the same with the pins partly withdrawn, the band being shown ready to place in position on the rim.

Figure 4 is a vertical longitudinal section similar to Figure 3 with the pins further withdrawn, the band being completely withdrawn, placed on the rim, (the fully withdrawn position being indicated in dotted lines).

In the drawings, in which like numerals of reference designate like parts in all the figures, 1 is the base which supports a hydraulic cylinder 2 whose head 3 is provided with bracket arms 14, the purpose for which will presently appear.

The cylinder head carries standards 4 which support the table proper or top 5, the latter having slots 6 and a bearing boss 21 for the guide portion 8 of the piston rod 9, the parts 8 and 9 being of two diameters so as to present a shoulder 7 against which the spider 12 rests and is secured by a cross pin 13 or in any other suitable way. The piston rod 9 carries a piston 10 which works in the cylinder 2 and the rod is gland packed at 11 for the usual purpose.

The bracket arms 14 carry bolts or cross pins 17 that operate in the slots 16 of the slotted guides or supports 15 that carry the finger carriers 18 on which the stretching fingers 19 are secured. The guides 15 adjacent to the plate 18 are link connected at 20 with the spider 12.

The fingers 19 are preferably rounded and tapered at 22 to facilitate slippage along the rim in withdrawing the fingers.

23 represents the rim of the tire and 24 the tire band which is to be located on the rim.

In using my invention the piston 10 is caused (by suitable hydraulic pressure and control valves of the ordinary type, not shown) to lower, thereby drawing down the guides or supports 15 and consequently lowering the fingers 19. As the upper end of the slots 16 is reached by the pins 17 the downward movement of the supports 15 will be arrested and further downward movement of the piston 10 will cause the fingers 19 to be drawn inwardly toward the center of the table as shown in Figure 4. In this retracted position the rubber band 24 is placed on the table around the fingers and then the movement of the piston is reversed. The upthrust on the piston raises the fingers 19, causing them to project upwardly within the inner circumference of the band until the lowermost extremity of the slots 16 is reached by the pins 17, whereupon further movement of the piston 10 upwardly causes the supports 15 to be thrust outwardly carrying the pins 19 toward the periphery of the table and stretching the band. The rim is then placed in position within the circumference of the pins and the movement of the piston reversed to again move it toward its lowermost position. The action causes the pins first to move toward the center of the table due to the contracting force of the band until the pins 19 engage the rim, centering the rim. The rim then acts as an abutment for the pins 19 and prevents further movement toward the center of the table; continued downward movement of the piston then causes the guides 15 to be lowered, drawing down the pins 19 and removing them from between the rim and band, thus permitting the band to contract into the rim groove where it is to be located.

Upon completion of the downward withdrawal of the pins the assembly may be slid off the table top or lifted off as preferred and the machine will be ready for the next operation.

From the foregoing description, taken in connection with the accompanying drawings, it is thought the complete construction, operation and advantages of my invention will be clear to those skilled in the art to which it appertains.

What I claim is:

1. A tire band expander comprising a table having slots, fingers projecting through said slots and movable from and toward the axis of the table to expand and release a band, and movable up and down in a direction approximately parallel to the axis of the table to project and withdraw the pins, and means for effecting the aforesaid movements of the pins, substantially as shown and described.

2. A tire band expander comprising a support including a table top to receive the band and rim, finger carriers with fingers, said table top having passages for the fingers, means operating during a part of its movement to advance or withdraw said fingers through said passages and operating during another part of its movement to move said fingers toward or away from the center of the table top substantially as shown and described.

3. A tire band expander comprising a support including a table top to receive the band and rim, finger carriers with fingers, said table top having passages for the fingers, means operating during a part of its movement to advance or withdraw said fingers through said passages and operating during another part of its movement to move said fingers toward or away from the center of the table top, said means comprising guides on which the finger carriers are mounted, and power operated instrumentalities for moving said guides.

4. A tire band expander comprising a support including a table top to receive the band and rim, finger carriers with fingers, said table top having passages for the fingers, means operating during a part of its movement to advance or withdraw said fingers through said passages and operating during another part of its movement to move said fingers toward or away from the center of the table top, said means comprising guides on which the finger carriers are mounted, a cylinder, piston and piston rod mechanism connected with said guides for operating the same.

5. A tire band expander comprising a support including a table top to receive the band and rim, finger carriers with fingers, said table top having passages for the fingers, means operating during a part of its movement to advance or withdraw said fingers through said passages and operating during another part of its movement to move said fingers toward or away from the center of the table top, said means comprising slotted guides, brackets to which said guides are mounted, fluid operated means linked to said guides for effecting the movements of the same.

MARK A. REPLOGLE.